(12) United States Patent
Vallabhu et al.

(10) Patent No.: US 9,510,378 B2
(45) Date of Patent: Nov. 29, 2016

(54) SYSTEMS AND METHODS FOR IMPLEMENTING A PEER-TO-PEER CONNECTION

(75) Inventors: Venkata R. Vallabhu, Aloha, OR (US); Rita Lee, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/977,624

(22) PCT Filed: Apr. 25, 2012

(86) PCT No.: PCT/US2012/035018
§ 371 (c)(1),
(2), (4) Date: May 2, 2014

(87) PCT Pub. No.: WO2013/133856
PCT Pub. Date: Sep. 12, 2013

(65) Prior Publication Data

US 2014/0233546 A1    Aug. 21, 2014

Related U.S. Application Data

(60) Provisional application No. 61/607,925, filed on Mar. 7, 2012.

(51) Int. Cl.
*H04W 76/02* (2009.01)
*H04W 8/00* (2009.01)
(Continued)

(52) U.S. Cl.
CPC ........... *H04W 76/023* (2013.01); *H04W 8/005* (2013.01); *H04W 84/12* (2013.01); *H04W 92/18* (2013.01)

(58) Field of Classification Search
CPC . H04W 76/023; H04W 84/12; H04W 88/06; H04W 76/025; H04W 88/02; H04W 92/18; H04W 76/00; H04W 84/00; H04W 76/02; H04W 76/028; H04L 67/104; H04L 67/1044; H04L 67/1091; H04L 29/06; H04L 67/1051; H04L 67/00; H04L 69/00
USPC ............ 370/315, 329, 395.5, 338, 431, 466, 370/469
See application file for complete search history.

(56) References Cited

U.S. PATENT DOCUMENTS 6,374,112 B1   4/2002   Widegren et al.
6,389,005 B1   5/2002   Cruickshank (Continued)

FOREIGN PATENT DOCUMENTS

WO   2008137582 A2   11/2008
WO   2013/133856 A1   9/2013

OTHER PUBLICATIONS

International Search Report and Written Opinion received for PCT Application No. PCT/US2012/035018, mailed on Feb. 27, 2013, 10 pages.

(Continued)

*Primary Examiner* — Pao Sinkantarakorn
*Assistant Examiner* — Michael Phillips
(74) *Attorney, Agent, or Firm* — Sutherland Asbill & Brennan LLP

(57) ABSTRACT

Systems and methods are presented for connecting related applications over a peer-to-peer wireless connection using a wireless interface module that minimizes the requirements for an application to initiate a wireless connection with another device. In some embodiments, a wireless interface module may be incorporated into mobile devices to provide a simplified instruction set requirement for an application to initiate a wireless connection.

22 Claims, 5 Drawing Sheets

(51) Int. Cl.
*H04W 92/18* (2009.01)
*H04W 84/12* (2009.01)

(56) References Cited

U.S. PATENT DOCUMENTS

| | | | |
|---|---|---|---|
| 6,760,314 | B1 | 7/2004 | Iwata |
| 8,437,364 | B2 * | 5/2013 | Lioy et al. ............... 370/463 |
| 2001/0038610 | A1 | 11/2001 | Decker et al. |
| 2002/0068566 | A1 | 6/2002 | Ohlsson et al. |
| 2002/0085516 | A1 | 7/2002 | Bridgelall |
| 2004/0131078 | A1 | 7/2004 | Gupta et al. |
| 2007/0058669 | A1 | 3/2007 | Hoffmann et al. |
| 2009/0177772 | A1 * | 7/2009 | Guan ........................ 709/224 |
| 2009/0222405 | A1 * | 9/2009 | Cara et al. ...................... 707/2 |
| 2010/0250767 | A1 * | 9/2010 | Barreto et al. ............. 709/231 |
| 2011/0044198 | A1 | 2/2011 | Persson et al. |
| 2011/0082939 | A1 * | 4/2011 | Montemurro et al. ...... 709/227 |
| 2011/0082940 | A1 | 4/2011 | Montemurro |
| 2011/0258313 | A1 | 10/2011 | Mallik |
| 2011/0314145 | A1 * | 12/2011 | Raleigh et al. ............. 709/224 |
| 2012/0008529 | A1 * | 1/2012 | Averbuch et al. .......... 370/255 |
| 2012/0020248 | A1 * | 1/2012 | Granlund et al. ........... 370/254 |
| 2012/0155298 | A1 | 6/2012 | Yang et al. |
| 2012/0315905 | A1 | 12/2012 | Zhu et al. |
| 2013/0036231 | A1 * | 2/2013 | Suumaki ..................... 709/228 |
| 2013/0229944 | A1 * | 9/2013 | Montemurro et al. ...... 370/254 |
| 2014/0057670 | A1 * | 2/2014 | Lim et al. ................... 455/509 |
| 2014/0314059 | A1 * | 10/2014 | Yoon et al. ................. 370/338 |

OTHER PUBLICATIONS

Office Action for Japanese Application No. 2014-560899 mailed Oct. 6, 2015 (10 pages, including 5 pages of translation).

Extended European Search Report for European Application No. 12870786.6 mailed Nov. 20, 2015 (9 pages).

Office Action from Japanese Application No. 2014-560899 mailed Apr. 12, 2016. (5pgs., including 2 pgs. translation).

* cited by examiner

SYSTEMS AND METHODS FOR IMPLEMENTING A PEER-TO-PEER CONNECTION

TECHNICAL FIELD

This disclosure generally relates to systems and methods for implementing Peer-to-Peer connections.

BACKGROUND

The advances in mobile device computing have expanded the scope and capability of the auctions that are expected to be performed on an on-demand basis. The amount and scope of tasks being performed by mobile devices require increasing amounts of network connectivity to meet user's needs. Also, as the demand for mobile device applications has increased the number of application providers has also increased. The increased amount of providers requires mobile devices to interface with a greater number of applications from a much more diverse pool of providers.

Mobile device applications are increasingly dependent on being networked with other devices, servers, or other information sources to provide useful and informative applications to users. Hence, application providers rely heavily on being able to engage the mobile device's wireless module to maximize and/or optimize the functionality of their applications. Accordingly, there is a strong consumer need to have a highly reliable way to engage and in maintain a wireless connection for a variety of applications that are created by a diverse group of developers who may have variable subject matter expertise on wireless operations.

BRIEF DESCRIPTION OF THE FIGURES

The features within the drawings are numerically notated to be cross referenced with the written description. Generally, the first numeral reflects the drawing number where the feature was first introduced, and the remaining numerals are intended to distinguish the feature from the other notated features within that drawing. However, if a feature is used across several drawings, the number used to identify the feature in the drawing where the feature first appeared will be used. Reference will now be made to the accompanying drawings, which are not necessarily drawn to scale and wherein.

DETAILED DESCRIPTION OF EMBODIMENTS OF THE INVENTION

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Embodiments described in this disclosure may provide systems, methods, and apparatuses for implementing a wireless connection between two mobile devices by using a simplified protocol. In one aspect, a mobile device user wants to exchange data or information related with another mobile device user. However, the application may not include the requisite capability to open and manage a wireless connection in a timely and efficient manner. A wireless interface module may be incorporated into the mobile device to provide a simplified instruction set requirement for the applications to initiate a wireless connection. The simplified instruction set may minimize the amount of interaction between the application and the wireless system and reduces the programming complexity of the application. One of the advantages of the wireless interface module is minimizing the chance of error by reducing the amount of instructions required from the application to initiate a wireless connection. Another of the many advantages would be the ability to update or change the wireless system and not require the applications to be updated to account for the updates to the wireless system. Further, the wireless interface module may manage the wireless system based on historical performance of the device and the connections made with other devices independent of the instructions received from the application.

Example embodiments of the invention will now be described with reference to the accompanying figures.

Figure 1:
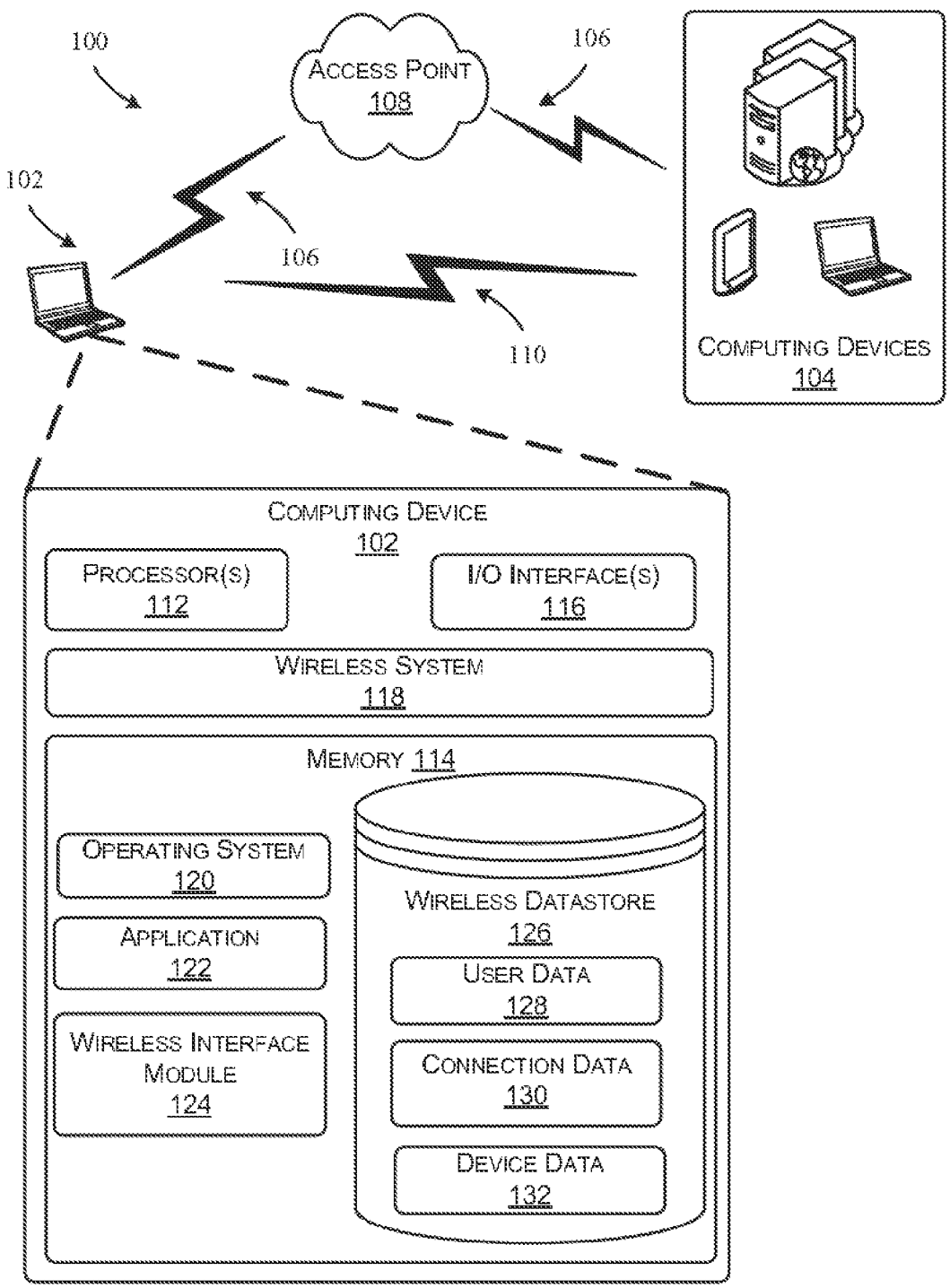
FIG. 1 is a simplified block diagram of a representative environment of a device that uses a wireless interface module to manage the device's wireless interactions with other devices in accordance with one or more embodiments of the disclosure.

FIG. 1 is a simplified block diagram of a representative environment 100 of a device 102 that may use a wireless interface module 124 to manage the device's wireless interactions with other devices over a wireless connection 106 via, an access point 108 or a peer-to-peer wireless connection 110.

In one embodiment, the device 102 may include a computer processor 112 to execute computer-readable instructions stored in memory 114. The one or more computer processors 112 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The device 102 may also include a chipset (not shown) for controlling communications between the one or more processors 112 and one or more of the other components of the device 102. In certain embodiments, the device 102 may be based on an Intel® Architecture system and the processor(s) 112 and chipset may be from a family of Intel® processors and chipsets, such as the Intel® Atom® processor family. The one or more processors 112 may also include one or more application-specific integrated circuits (ASICs) or application-specific standard products (ASSPs) for handling specific data processing functions or tasks.

The device 102 may also include an I/O interface 116 which may include a variety of elements that enable the display of content and/or or receiving user inputs. For instance, the I/O interface may include a display, a keyboard, a mouse, a touch screen display, a voice recognition interface, a motion recognition interface, and/or a touchpad.

The device 102 may also include a wireless system 118 that includes the hardware and software to broadcast and receive messages either using the Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system 118 may include a transmitter and a receiver or a transceiver (not shown) capable of operating in a broad range of operating frequencies governed by the 802.11 wireless standard.

In one embodiment, the memory 114 may store a variety of modules to operate the device and provide various aspects of functionality that are common to mobile devices. For example, an operating system 120 may provides file management capability, interpret user inputs, and manage the resources on the device 102. The operating system 120 may provide the computer processor 112 with a variety of instruction sets to perform mathematical or logic operations that enable the functionality of the display and other sensory elements that present content to or receive content from the user. The memory 114 may also store one or more applications 122 that perform a variety of tasks or operations on the device 102 or that may perform tasks in conjunction with other devices 104 via a wireless connection 110. For instance, the application 122 may include a browser, a GPS device, a word processor, a database interface, an audiovisual player, or a task specific application that queries other devices 104 for information requested by the device 102 and/or information, needed to perform specific tasks on the device 102.

The memory 114 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

In this embodiment, the device 102 may also includes a wireless interface module 124 that can act as an intermediary between the application 122 and the wireless system 118. The wireless interface module 124 may enable the application 122 developers to utilize the wireless system 118 without knowing the specific techniques and technology of the wireless system 118. For example, as the wireless system is upgraded or optimized over time the way in which the application 122 interfaces with the wireless system may not need to change in order to use the improved or upgraded wireless capabilities.

The device 102 may include a wireless data store 126 that logs wireless system operations and performance. In this embodiment, the wireless data store 126 may include a user data module 128, a connection data module 130, and a device data module 132. The user data module 128 may record user data on the device 102 as well as the user data from other devices 104 that are exchanging data with the device 102. The connection data 130 may record a historical record of wireless connection performance and capability. Lastly, the device data module 132 stores device information or configurations of the devices 104 that are exchanging information over the wireless connections 106, 108. The wireless interface module 124 can use the data described above to optimize the initiating process of the wireless system 118. The optimization concepts will be discussed in greater detail below.

In one embodiment, the wireless interface module 124 operates to reduce the amount interaction between the application 122 and the wireless system 118 dining the establishment of a wireless connection between the device 102 and the one or more of the other devices 104. In one example, the wireless interface module 124 receives a connection request from the application 122 or the other devices 104 and establishes the wireless connection with minimal interaction from application 122. Hence, the application 122 can establish a wireless connection without detailed knowledge of wireless standards, equipment, or capability. Minimal, application interaction can include sending a connection request to the wireless interface module 124 and receiving a confirmation that the wireless connection 106 is enabled and ready for use by the application 122. The details of establishing a wireless connection are managed by the wireless interface module 124. Further, the wireless interface 124 can optimize the establishment of the connection based on data stored in the wireless data store 126.

In another embodiment, the wireless connection 106 can be established using the Wi-Fi Direct standard. Under this standard, the device 102 can be in one of the following states: discoverable mode, group owner mode, or station mode. In discoverable mode, the device 102 can discover other devices and is ready to connect with other devices over a wireless connection. However, the device 102 is not usually connected wirelessly to any other device when it is in discoverable mode. Group owner mode is when the device 102 is connected to one or more devices 104 and is available to connect with other devices that want to join the group. In this mode, the device 102 is the group owner and operates as an access point or "hot spot" for the other devices on the network. When the device 102 is in station mode, the device is connected to a group owner device that is acting as an access point for the group. While in station mode, the device is not typically connected with any other device directly. Wi-Fi Direct devices are symmetric and can be in any of these three modes. Hence, the way in which the wireless interface module 124 can establish a connection between devices can vary depending on the current mode or state of the device. Therefore, the wireless interface module 124 can monitor or determine the states of the devices 104 that may be in range of the device 102 and use that information to determine if a wireless connection should or can be initiated. For example, if the device 104 is in station mode, the wireless interface module 124 will not attempt to establish a connection with that device 104. However, if the device 104 is in group owner mode or discoverable mode, the wireless interface module 124 will direct the wireless system 118 to attempt a wireless connection with the device 104.

FIGS. 2-5 are flow diagrams illustrating various method embodiments regarding the interaction between the application 122, the wireless interface module 124, and the wireless system 118 during the establishment of a wireless connection between the device 102 and the device 104.

Figure 2:
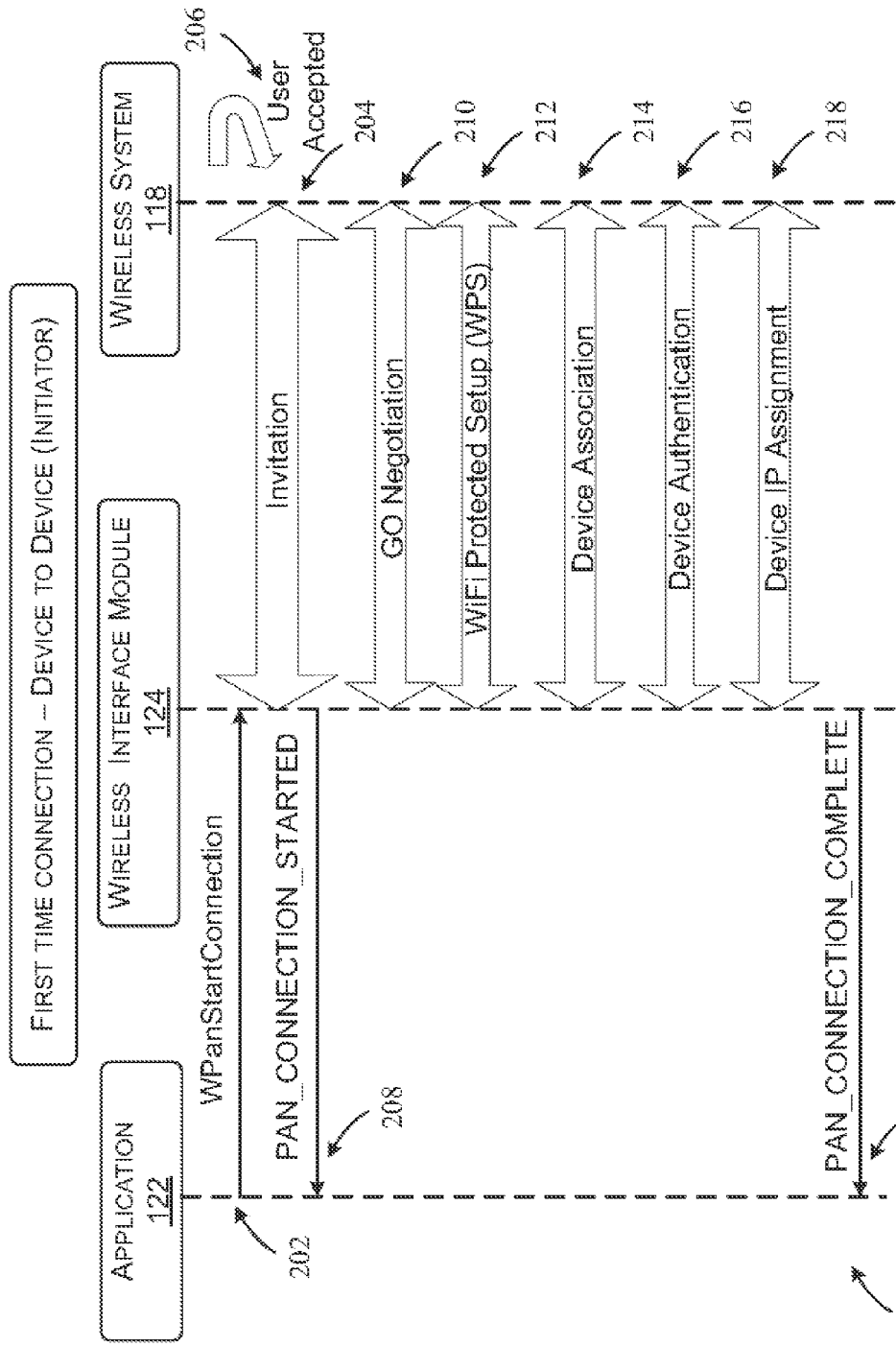
FIG. 2 is a flow diagram illustrating an exemplary method for initiating a wireless connection by an application on a mobile device for the first time in accordance with one or more embodiments of the disclosure.

FIG. 2 is a flow diagram of a method 200 for initiating a wireless connection by an application on a mobile device for the first time. In this embodiment the device 102 and the other device 104 are in discoverable mode or group owner mode. In this embodiment, the device 102 is initiating the connection and the devices 102, 104 are connecting for the first time.

In this embodiment, the application 122 initiates the connection by providing a connection request WPanStartConnection message 202 to the wireless interface module 124. Upon receipt of the connection message 202, the wireless interface module 124 provides an invitation or connection request 204 to the wireless system 118 which provides the invitation request to another device 104. If the device 104 provides a confirmation message 206 that indicates the device 104 is willing to establish, a wireless connection 110 then the wireless interface module 124 provides a PAN_CONNECTION_STARTED message 208 to the application 122.

To initiate the wireless connection 110, the wireless interface module 124 accesses the wireless data store 126 and notes that this is the first time a wireless connection 110 is being initiated between the devices 102, 104 and that the devices 102, 104 are in discoverable mode or group owner mode. As such, the wireless interface module 124 attempts to establish a wireless connection 110 by following a set of procedures that account for the states of the devices 102, 104, the capability and configuration of the devices, and the lack of history between the devices.

Although the set of actions are presented in a particular order, the actual order of the actions can vary or certain steps may be omitted in other embodiments. In this embodiment, for example, the wireless interface module 124 implements a group owner negotiation 210 to determine which device will be the group owner as described by the Wi-Fi Direct Standard. A Wi-Fi Protected Setup (WPS) operation 212 can be performed to validate any security credentials between the devices 102, 104. A device authorization 214, a device authentication 216, and device IP assignment 218 can also be performed. In alternative embodiments, any other Wi-Fi Direct operation can also be performed in conjunction with the method above in order to establish a wireless connection 110. Once the wireless connection 110 has been established, the wireless interface module 124 provides a PAN_CONNECT_COMPLETE message 220 to the application 122 indicating the application can begin exchanging information with the device 104.

Figure 3:
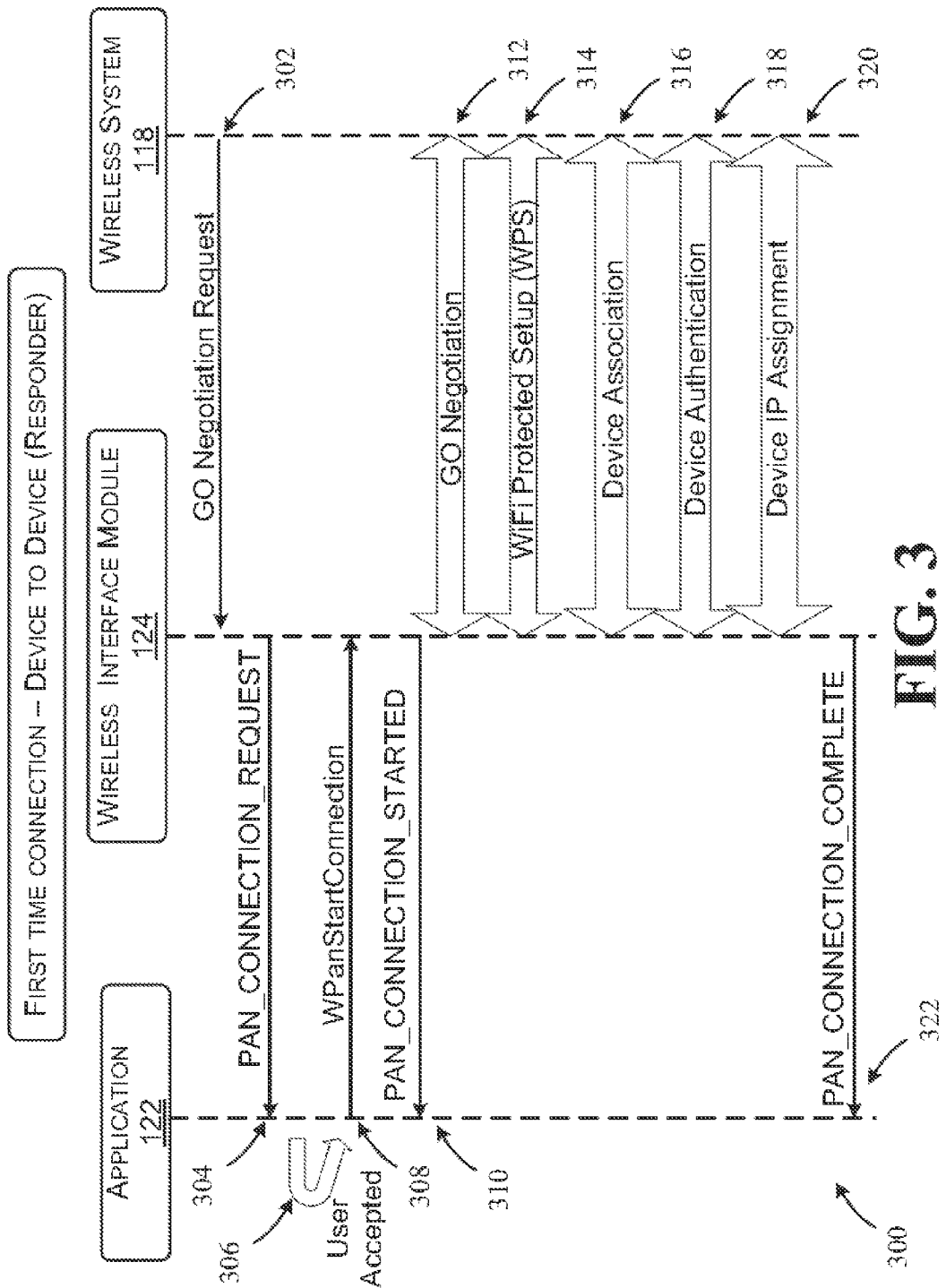
FIG. 3 is a flow diagram illustrating an exemplary method for initiating a wireless connection on a mobile device for the first time based at least in part on a request from another device in accordance with one or more embodiments of the disclosure.

FIG. 3 a flow diagram illustrating an exemplary method 300 for initialing a wireless connection 110 on a mobile device for the tint time based at least in part on a request from another device 104. In this embodiment, the device 102 and the other device 104 are in discoverable mode or group owner mode, the other device 104 is initiating the connection, and the devices 102, 104 are connecting for the first time.

In this embodiment, the device 104 sends a group owner negotiation message 302 to the wireless interface module 124 via the wireless system 118. The wireless interface module 124 provides a PAN_DEVICE_CONNECTION_REQUEST 304 to the application 122. If the user (not shown) of the application 122 indicates acceptance 306 of the response, the application 122 provides a WPanStartConnection message 308 to the wireless interface module 124. Accordingly, the wireless interface module 124 accesses the wireless data store 126 and determines that this is the first time a wireless connection is being initiated between the devices 102, 104. As such, the wireless interface module 124 attempts to establish a wireless connection 110 by following a set of procedures that account for the states of the devices 102, 104, the capability and configuration of the devices, and the lack of history between the devices.

Although the set of actions are presented in a particular order, the actual order of the actions can vary or certain steps may be omitted in other embodiments. In this embodiment, for example, the wireless interface module 124 implements a group owner negotiation 312 to determine which device will be the group owner. A Wi-Fi Protected Setup (WPS) operation 314 can be performed to validate any security credentials or authorizations. A device authorization 316, authenticationv 318, and device IP 320 assignment can also be performed. In alternative embodiments, the any other Direct operation can also be performed in conjunction with steps above in order to establish a wireless connection. Once the connection has been established, the wireless interface module provides a PAN_CONNECT_COMPLETE message 322 to the application 122 indicating the application 122 can begin exchanging information with the device 104.

Figure 4:
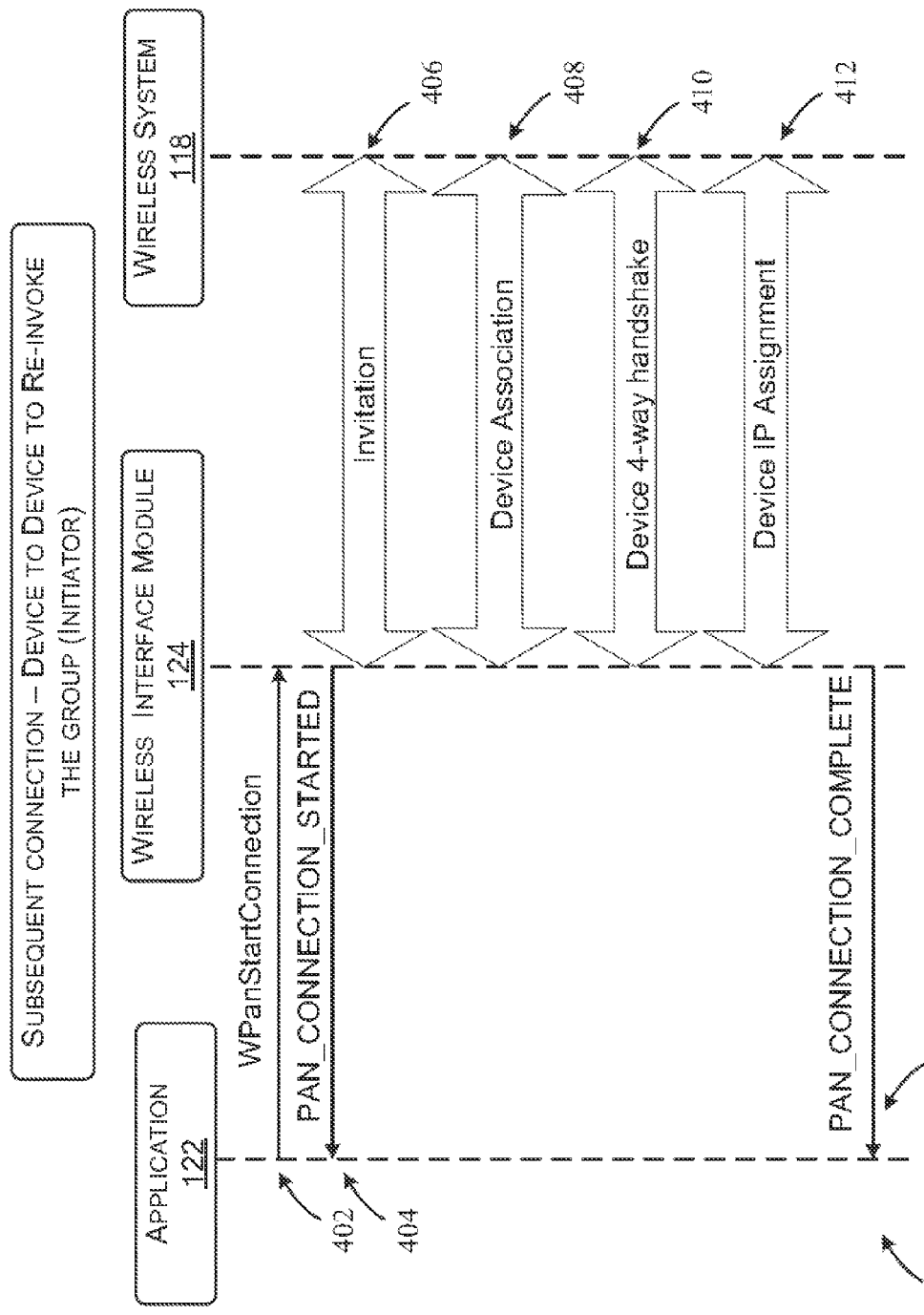
FIG. 4 is a flow diagram illustrating an exemplary method for initiating a subsequent wireless connection by an application on a mobile device in accordance with one or more embodiments of the disclosure.

FIG. 4 is a flow diagram illustrating an exemplary method 400 for initiating a subsequent wireless connection by an application on a mobile device. In method 400 the device 102 and the other device 104 are in discoverable mode or group owner mode, the device 102 is initiating the connection, and the devices 102, 104 are connecting for a subsequent time.

In this embodiment, the application 122 initiates the connection by providing a connection request WPanStartConnection message 402 to the wireless interface module 124. Upon receipt of the connection request 402, the wireless interface module 124 accesses the wireless database store 124 or is flagged by the wireless database store 124 to indicate that this wireless connection would be a subsequent connection between the devices 102, 104. Based at least in part on this determination, the wireless interface module 124 provides a PAN_CONNECTION_STARTED message 404 to the application 122 and an invitation request 406 to the wireless system 118 which is passed on to the device 104.

Although the following set of actions are presented in a particular order, the actual order of the actions can vary or certain actions may be omitted in other embodiments. In this embodiment, for example, the wireless interface module 124 initiates a device association 408, a 4-way handshake 410, and a device IP assignment 412 following an affirmative response from the device 104. In alternative embodiments, any other Wi-Fi Direct operation can also be performed in conjunction with actions above in order to establish a wireless connection. Once the connection has been established, the wireless interface module provides a PAN_CONNECT_COMPLETE 414 message to the application 122 indicating that the application 122 can begin exchanging information with the device 104.

Figure 5:
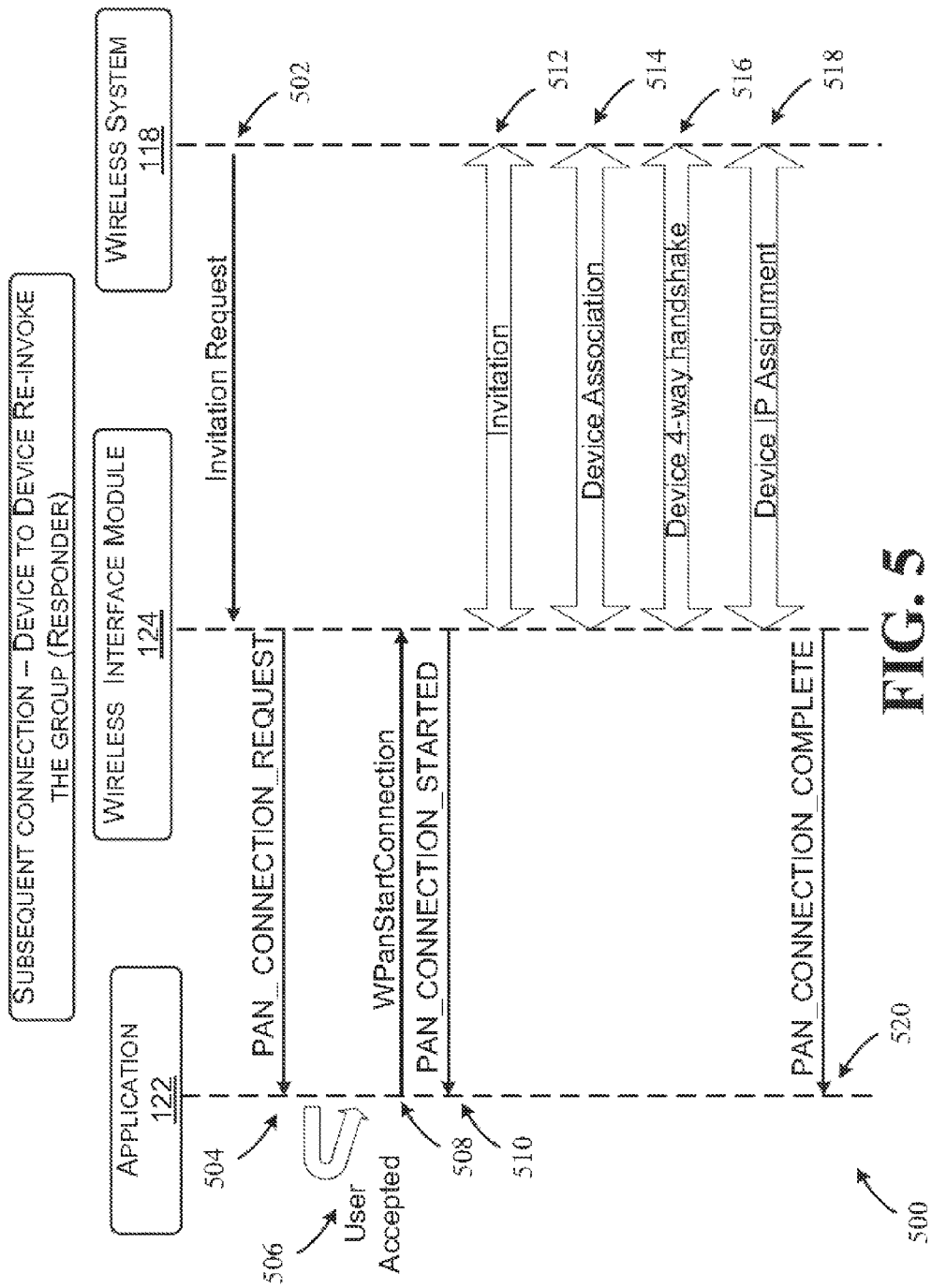
FIG. 5 is a flow diagram illustrating an exemplary method for initiating a subsequent wireless connection on a mobile device based at least in part on a request from another device in accordance with one or more embodiments of the disclosure.

FIG. 5 is a flow diagram illustrating an exemplary method 500 for initiating a subsequent wireless connection on a mobile device based at least in part on a request from another device. The method 500 illustrates a connection embodiment when the device 102 and the other device 104 are in discoverable mode or group owner mode, the device 104 is initiating the connection, and the devices 102, 104 are connecting for a subsequent time.

In this embodiment, the device 104 sends an invitation request 502 to the wireless interface module 124. The wireless interface module 124 provides a WPAN_DEVICE_CONNECTION_REQUEST 504 to the application 122. If the user (not shown) of the application 122 indicates acceptance of the response 506, the application 122 provides a WPanStartConnection 508 message to the wireless interface module 124. Accordingly, the wireless interface module 124 accesses the wireless database store 124 and determines that this is not the first time a wireless connection is being initiated between the devices 102, 104. As such, the wireless interface module 124 attempts to establish a wireless connection 108 and send a PAN_CONNECTION_STARTED message 510 to the application 122.

Although the following set of actions are presented in a particular order, the actual order of the actions can vary or certain steps may be omitted in other embodiments. In this embodiment, for example, the wireless interface module 124 initiates a device association 514, a 4-way handshake 516, and a device IP assignment 518. In alternative embodiments, any other Wi-Fi Direct operation can also be performed in conjunction with steps above in order to establish a wireless connection. Once the connection has been established, the wireless interface module 124 provides a PAN_CONNECT_COMPLETE message 520 to the application 122 indicating the application can begin exchanging information with the device 104.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination, of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation in the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The following examples pertain to further embodiments. A device comprising an application that generates a wireless connection request, a wireless interface module that generates a connection protocol based at least in part on receiving the wireless connection request from the application, and a wireless communications module comprising a transceiver that sends and receives wireless messages to establish a wireless connection based at least in part on the connection protocol received from the wireless interface module. In one embodiment, the connection protocol is further based at least in part on whether the wireless connection request comprises a first wireless connection request or a subsequent wireless connection. Further, the connection protocol is further based at least in part on the device being in a discoverable mode or a group owner mode. In another embodiment, the wireless connection request comprises the first wireless connection request, the connection protocol comprises a group owner negotiation request. In another instance, the wireless connection request comprises the subsequent wireless connection request, the connection protocol comprises an invitation request.

In yet another embodiment, the wireless connection request is a first wireless connection request and the connection protocol is a first connection protocol, the wireless interface module generates a second connection protocol based at least in part on receiving a second wireless connection request from the application, the second connection protocol being different than the first connection protocol.

The device can also comprise a wireless data store that records user data on the device, user data from one or more other devices that are exchanging information with the device, an historical record of wireless connection performance of the device, and device information or configurations of the one or more other devices that are exchanging information with the device. Lastly, the connection protocol is based at least in part on whether the wireless connection request comprises a first time connection or a subsequent connection, and any information stored in the wireless data store.

In yet another embodiment, a method comprises receiving a wireless connection request from an application on a device, generating a wireless connection protocol, using a computer processor, based at least in part on the wireless connection request comprising a first wireless connection request or a subsequent wireless connection request, the wireless connection protocol based on the first wireless connection request being different from the wireless connection protocol based on the subsequent wireless connection request, providing the wireless connection protocol to a wireless communications system on the device to initiate a wireless connection, providing a wireless connection initiation message to the application, establishing the wireless connection based at least in part on the wireless connection protocol, and providing a wireless connection message to the application.

In another embodiment, the wireless connection protocol is further based at least in part on whether the device is in a discoverable mode or a group owner mode.

In another embodiment, the method may thither comprise receiving a negotiation request from the wireless communications system, the negotiation request being indicative of the first wireless connection request for the device, and providing a peer-to-peer connection request to the application based at least in part on receiving the negotiation request and prior to receiving the wireless connection request from the application.

In yet another embodiment, the method may further comprise receiving an invitation request from the wireless communications system, the invitation request being indicative of the subsequent wireless connection request for the device, and providing a peer-to-peer connection request to the application based at least in part on receiving the invitation request and prior to receiving the wireless connection request from the application.

In another embodiment, the wireless connection request is further based at least in part on user data of the device, user data from one or more other devices that are exchanging information with the device, an historical record of wireless connection performance of the device, and device information or configurations of the one or more other devices that are exchanging information with the device.

Further, the wireless connection protocol of the first wireless connection request comprises a group owner negotiation protocol, a Wi-Fi Protected Setup protocol, a device association protocol, a device authentication protocol; and/or a device IP assignment protocol.

In another embodiment, the wireless connection protocol of the subsequent wireless connection request comprises an invitation protocol, a device association protocol, a device 4-way handshake protocol, and/or a device IP assignment protocol.

In yet another embodiment, the method described above in the preceding paragraphs can be implemented by one or more tangible computer-readable storage media comprising computer-executable instructions operable to, when executed by at least one computer processor, enable the at least one computer processor to implement the method described above.

In yet another embodiment, a communication device including memory, one or more computer processors, and a wireless communication system implements the method described above in the preceding paragraphs.

The claimed invention is:

1. A method comprising:
   receiving, by a wireless interface module of a first device, a wireless connection request from an application on the first device to connect to a second device;
   receiving, by the wireless interface module, an indication from the second device to connect to the first device;
   determining, by the wireless interface module computer processor, that the wireless connection request is an initial wireless connection request;
   generating, by the wireless interface module, a wireless connection protocol in response to the wireless connection request and using a set of procedures that account for a first state associated with the first device based on the determination of an initial wireless connection request, a second state associated with the second device, a first configuration of the first device, and a second configuration of the second device, wherein the wireless connection request is independent of the first state or the second state;
   providing the wireless connection protocol to a wireless communications system on the first device to initiate a wireless connection;
   providing a wireless connection initiation message to the application;
   establishing the wireless connection based at least in part on the wireless connection protocol; and
   providing a wireless connection message to the application.

2. The method of claim 1, wherein the wireless connection protocol is further based at least in part on whether the first device is in a discoverable mode or a group owner mode.

3. The method of claim 1, further comprising:
   receiving a negotiation request from the wireless communications system, the negotiation request being indicative of the wireless connection request for the first device; and
   providing a peer-to-peer connection request to the application based at least in part on receiving the negotiation request and prior to receiving the wireless connection request from the application.

4. The method of claim 1, further comprising:
   receiving an invitation request from the wireless communications system, the invitation request being indicative of a subsequent wireless connection request for the first device; and
   providing a peer-to-peer connection request to the application based at least in part on receiving the invitation request and prior to receiving the wireless connection request from the application.

5. The method of claim 1, wherein the wireless connection request is further based at least in part on user data of the first device, user data from one or more other devices that are exchanging information with the first device, an historical record of wireless connection performance of the first device, and device information or configurations of the one or more other devices that are exchanging information with the first device.

6. The method of claim 1, wherein the wireless connection protocol of the wireless connection request comprises:
   a group owner negotiation protocol;
   a Wi-Fi Protected Setup protocol;
   a device association protocol;
   a device authentication protocol; and/or
   a device IP assignment protocol.

7. The method of claim 1, wherein the wireless connection protocol of a subsequent wireless connection request comprises:
   an invitation protocol;
   a device association protocol;
   a device 4-way handshake protocol; and/or
   a device IP assignment protocol.

8. One or more tangible non-transitory computer-readable storage media comprising computer-executable instructions operable to, when executed by at least one computer processor, enable the at least one computer processor to implement a method comprising:
   receiving, by a wireless interface module of a first device, a wireless connection request from an application on the first device to connect to a second device;

receiving, by the wireless interface module, an indication from the second device to connect to the first device;

determining, by the wireless interface module, that the wireless connection request is an initial wireless connection request;

generating, by the wireless interface module, a wireless connection protocol in response to the wireless connection request and using a set of procedures that account for a first state associated with the first device based on the determination of an initial wireless connection request, a second state associated with the second device, a first configuration of the first device, and a second configuration of the second device, wherein the wireless connection request is independent of the first state or the second state;

providing, by the wireless interface module, the wireless connection protocol to a wireless communications system on the first device to initiate a wireless connection;

providing, by the wireless interface module, a wireless connection initiation message to the application;

establishing, by the wireless interface module, the wireless connection based at least in part on the wireless connection protocol; and providing, by the wireless interface module, a wireless connection message to the application.

9. The tangible computer-readable storage media of claim 8, wherein the wireless connection protocol is further based at least in part on whether the first device is in a discoverable mode or a group owner mode.

10. The tangible computer-readable storage media of claim 8, further comprising:
receiving a negotiation request from the wireless communications system, the negotiation request being indicative of first wireless connection request for the first device; and
providing a peer-to-peer connection request to the application based at least in part on receiving the negotiation request and prior to receiving the wireless connection request from the application.

11. The tangible computer-readable storage media of claim 8, further comprising:
receiving an invitation request from the wireless communications system, the invitation request being indicative of a subsequent wireless connection request for the first device; and
providing a peer-to-peer connection request to the application based at least in part on receiving the invitation request and prior to receiving the wireless connection request from the application.

12. The tangible computer-readable storage media of claim 8, wherein the wireless connection request is further based at least in part on user data of the first device, user data from one or more other devices that are exchanging information with the first device, an historical record of wireless connection performance of the first device, and device information or configurations of the one or more other devices that are exchanging information with the first device.

13. The tangible computer-readable storage media of claim 8, wherein the wireless connection protocol of the wireless connection request comprises:
a group owner negotiation protocol;
a Wi-Fi Protected Setup protocol;
a device association protocol;
a device authentication protocol; and/or
a device IP assignment protocol.

14. The tangible computer-readable storage media of claim 8, wherein the wireless connection protocol of a subsequent wireless connection request comprises:
an invitation protocol;
a device association protocol;
a device 4-way handshake protocol; and/or
a device IP assignment protocol.

15. A device comprising:
at least one antenna;
at least one transceiver;
a wireless interface module;
at least one memory storing computer-executable instructions; and
at least one processor, wherein the at least one processor is configured to access the at least one memory and to execute the computer-executable instructions to:
receive, by the wireless interface module, a wireless connection request from an application of the device to connect to a second device;
determine, by the wireless interface module that the wireless connection request is an initial wireless connection request;
generate, by the wireless interface module, a connection protocol in response to the wireless connection request from the application and use a set of procedures that account for a first state associated with the device based on the determination of an initial wireless connection request, a second state associated with the second device, a first configuration of the device, and a second configuration of the second device, wherein the wireless connection request is independent of the first state or the second state; and
establish, by the wireless interface module, a wireless connection based at least in part on the connection protocol.

16. The device of claim 15, wherein the connection protocol is further based at least in part on whether the wireless connection request comprises a first wireless connection request or a subsequent wireless connection.

17. The device of claim 15, wherein the connection protocol is further based at least in part on the device being in a discoverable mode or a group owner mode.

18. The device of claim 15, wherein the connection protocol comprises a group owner negotiation request.

19. The device of claim 15, wherein the wireless connection request comprises a subsequent wireless connection request, the connection protocol comprises an invitation request.

20. The device of claim 15, wherein the wireless connection request comprises a first wireless connection request and the connection protocol comprises a first connection protocol, generate a second connection protocol based at least in part on receiving a second wireless connection request from the application, the second connection protocol being different than the first connection protocol.

21. The device of claim 15 further comprising a wireless data store to record user data on the device, user data from one or more other devices that are exchanging information with the device, an historical record of wireless connection performance of the device, and device information or configurations of the one or more other devices that are exchanging information with the device.

22. The device of claim 21, wherein the connection protocol is based at least in part on whether the wireless connection request comprises a first time connection or a subsequent connection, and any information stored in the wireless data store.

* * * * *